May 5, 1959  C. S. GARRATT, JR  2,885,170
VENTILATOR PANE THERMOMETER
Filed Sept. 23, 1955  2 Sheets-Sheet 1
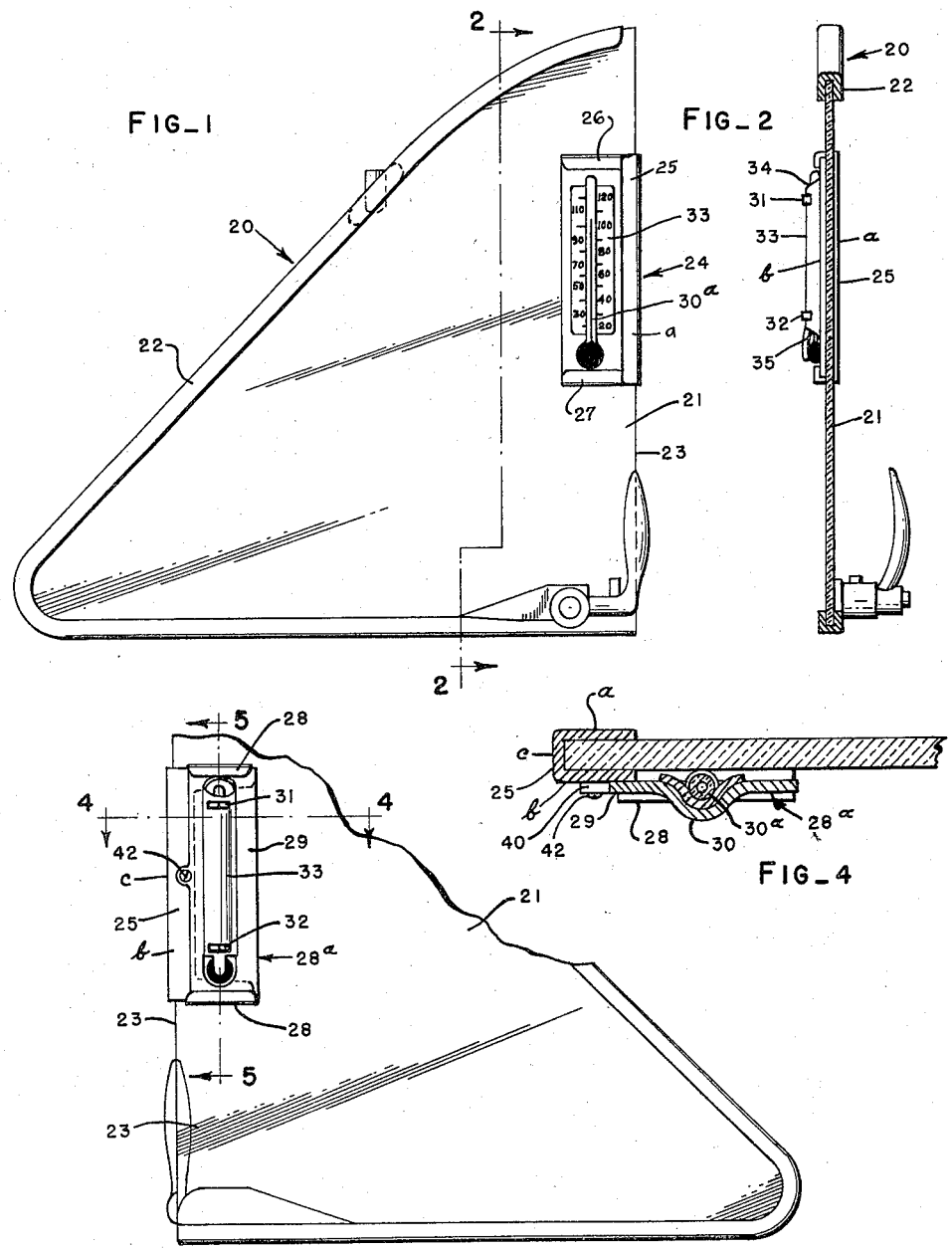
INVENTOR.
CHARLES S. GARRATT, JR.
BY
Patrick D. Beavers
ATTORNEY May 5, 1959 — C. S. GARRATT, JR — 2,885,170
VENTILATOR PANE THERMOMETER
Filed Sept. 23, 1955 — 2 Sheets-Sheet 2
FIG_5
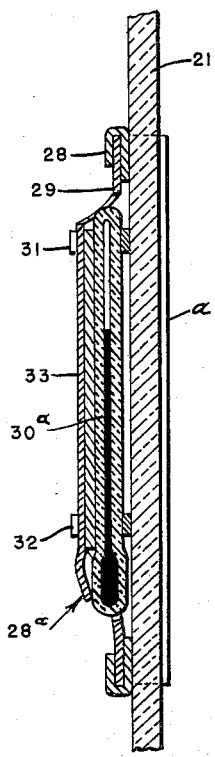
FIG_6
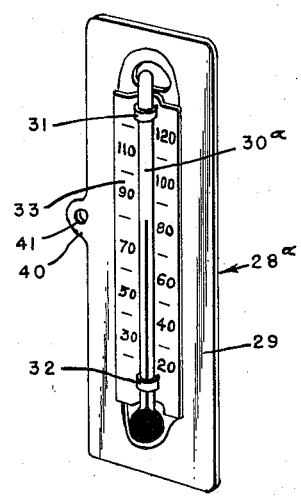
FIG_7
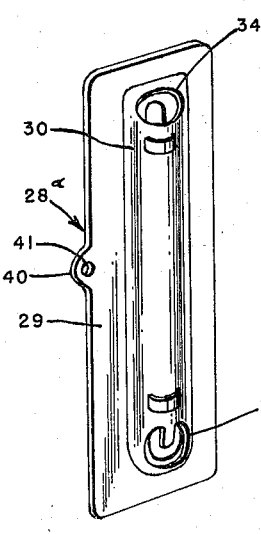
FIG_8
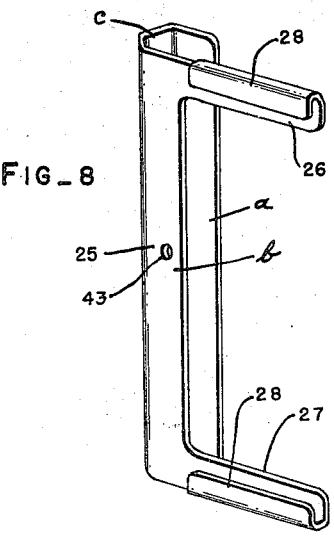
INVENTOR.
CHARLES S. GARRATT, JR.
BY
Patrick D Beavers
ATTORNEY

2,885,170
VENTILATOR PANE THERMOMETER

Charles S. Garratt, Jr., Suffolk, Va.

Application September 23, 1955, Serial No. 536,228

1 Claim. (Cl. 248—226)

This invention relates to improvements in means for supporting thermometers and more particularly to a thermometer and means for holding the same in place on an automobile ventilator pane.

Another object of the invention is to provide in combination with a ventilator pane such as forms standard equipment on automobiles, a holder, for removably holding the thermometer in a position so that the driver or an occupant of the automobile can ascertain the outside temperature.

Still another object of the invention is to provide a holder for automobile ventilator panes which can be utilized for holding thermometers, record cards and other items.

These and various other objects and advantages of the invention will become apparent to the reader of the following description.

In the drawing:

Figure 1 is a side elevational view of a ventilator pane showing the thermometer and holder in place thereon.

Figure 2 is a vertical sectional view taken on line 2—2 of Figure 1.

Figure 3 is a fragmentary outside elevational view of the assembly.

Figure 4 is an enlarged fragmentary sectional view taken on line 4—4 of Figure 3.

Figure 5 is an enlarged fragmentary vertical sectional view taken on line 5—5 of Figure 3.

Figure 6 is a perspective view of the thermometer unit.

Figure 7 is a perspective view of the thermometer unit, looking at the opposite side from that shown in Figure 6.

Figure 8 is a perspective view of the holder.

Referring to the drawings wherein like numerals designate like parts, it can be seen that numeral 20 generally refers to a ventilator window which includes a pane 21 and a protective frame 22 therefor. One edge portion 23 is bare and it is upon this edge portion that the present invention generally referred to by numeral 24 is positioned.

This unit 24 includes a frame (shown in Figure 8), this frame consisting of a channeled member 25 made up of sidewalls *a* and *b* and a connecting back wall *c*.

The upper and lower ends of the wall *b* are provided with outstanding arms 26, 27 and each has a tongue 28, these tongues being bent outwardly and toward each other in spaced relation with respect to the corresponding arms.

This, so far described frame is of spring sheet metal and the walls *a*, *b* are of such spaced relation as to be capable of disposition over the free edge portion of a pane 21 where the frame will frictionally remain in place.

Numeral 28a generally refers to a thermometer unit, this including a rectangular shaped plate 29 having a longitudinal depressed portion 30 for containing a thermometer tube 30a, the same being held in the depressed portion 30 by bands 31, 32, anchored to the plate 29. There may be a backing panel or plate 33 with indicia thereon for the thermometer tube 30. The upper and lower portions of the depressed portion 30 are formed with openings 34, 35.

The depression 30 is sufficiently deep so that the thermometer tube 30a will be seated and not in direct contact with the pane 21.

The upper and lower ends of the rectangular plate 29 frictionally engage under the tongues 28, as is apparent.

The thermometer 30a being at the outside of the pane 21 will be influenced by the outside temperature and readings, of course, can be taken from the plate 33, through the transparent pane 21. It will also be understood that the thermometer and its holder can be removed from the driver's side of the vehicle to the opposite side, simply by removing the thermometer and reversing the position of the holder after which the thermometer is again replaced.

It is desirable that the plate 29 be formed with an ear 40 having an opening 41 therein for receiving a set screw 42 and this set screw is to be driven into a threaded opening 43 of the channeled member 25, so that the plate 29 and the thermometer will be prevented from displacement.

It is further to be understood that a holder of this character can be used for holding record cards such as are used in recording gasoline changes, hydramatic fluid inspections, brake checks, etc.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

A device of the character described comprising a vertically extending channeled member composed of a pair of sidewalls and an interconnecting back wall, a pair of horizontally extending arms each integrally formed respectively with the upper and lower portions of one of said side walls, said one side wall having a centrally disposed opening, a tongue integrally formed with each arm, said tongues extending laterally from the arm, in a direction opposite the other of said side walls, and then inwardly toward each other to form confronting channels, an article-carrying plate seated in the channels, an ear formed integrally with one side of said plate and having an opening therein, and a set screw receivable in said openings in said plate and said side wall.

References Cited in the file of this patent
UNITED STATES PATENTS

| 1,339,288 | Richards | May 4, 1920 |
|---|---|---|
| 1,605,466 | Roedell | Nov. 2, 1926 |
| 1,757,280 | Withrow | May 6, 1930 |
| 2,276,179 | Ford | Mar. 10, 1942 |
| 2,445,606 | Davis | July 20, 1948 |
| 2,592,684 | Grinshow | Apr. 15, 1952 |